United States Patent
Hayes

(10) Patent No.: US 7,037,105 B2
(45) Date of Patent: May 2, 2006

(54) HEATING APPARATUS FOR WELLS

(76) Inventor: Gerald Hayes, P.O. Box 84, Laporte, SK (CA) S0L 1W0

(*) Notice: Subject to any disclaimer, the term of this patent is extended or adjusted under 35 U.S.C. 154(b) by 0 days.

(21) Appl. No.: 11/105,074

(22) Filed: Apr. 13, 2005

(65) Prior Publication Data

US 2005/0224223 A1   Oct. 13, 2005

(30) Foreign Application Priority Data

Apr. 13, 2004  (CA) .................................. 2464148

(51) Int. Cl.
*F02M 15/02* (2006.01)

(52) U.S. Cl. ............................ 432/63; 432/62; 166/62; 166/302

(58) Field of Classification Search .................... 432/1, 432/62, 63; 237/70, 71; 166/57, 62, 302
See application file for complete search history.

(56) References Cited

U.S. PATENT DOCUMENTS

| | | | | |
|---|---|---|---|---|
| 4,264,826 A | * | 4/1981 | Ullmann ........................ 290/2 |
| 5,335,728 A | * | 8/1994 | Strahan ........................ 166/267 |
| 5,375,539 A | * | 12/1994 | Rippberger ................. 110/238 |
| 6,644,400 B1 | * | 11/2003 | Irwin, Jr. .................. 166/75.12 |
| 6,776,227 B1 | * | 8/2004 | Beida et al. .................. 166/61 |

* cited by examiner

*Primary Examiner*—Gregory Wilson
(74) *Attorney, Agent, or Firm*—Law Offices of Albert Wai-Kit Chan, LLC

(57) ABSTRACT

An apparatus for warming objects such as production conduits at a well site comprises an internal combustion engine driving a well pump. A heat exchanger shell is connected to an exhaust port of the engine, and has an output port. A circulating pump is driven by the engine, and a heating circuit is connected to the circulating pump such that liquid in the heating circuit is pumped from a pump output of the circulating pump through the heating circuit to a pump intake of the circulating pump. The heating circuit comprises a heat absorbing portion inside the heat exchanger shell arranged such that heat from the exhaust of the engine is transferred to the liquid therein, and a heating conduit arranged adjacent to a production conduit or other desired object such that heat from the liquid in the heating conduit is transferred to the object.

24 Claims, 2 Drawing Sheets

HEATING APPARATUS FOR WELLS

This application claims priority of Canadian Application No. 2,464,148, Filed Apr. 13, 2004, the entire disclosure of which is incorporated by reference herein in its entirety.

This invention is in the field of heating apparatus, and in particular with such apparatus for use in heating conduits and like objects at well heads, such as oil and gas well heads, for example to facilitate the flow of fluid through the conduits in cold weather.

BACKGROUND

It is common in well sites to have well conduits carrying fluids such as oil and gas from the well to a storage tank, pipeline, or the like. In the very cold weather that is commonly encountered in northern areas, viscosity of the fluid increases, and can inhibit or block flow in these well conduits. It is not uncommon to close down wells in the winter because of these flow problems. Such closure is costly and undesirable, especially when petroleum prices are relatively high, as is often the case in the winter when demand for heat is greater.

Prior art directed to maintaining flow in such well conduits has commonly provided an electric heat tape or a heating conduit that is placed along side the well conduit and covered with insulation such that heat is transferred to the well conduit to raise the temperature and maintain flow therein. Where an electrical grid is not available, a major obstacle to this method has been sufficiently heating and circulating warm fluid in such a heating conduit.

A typical well site will include a small internal combustion engine operating a pump jack or other well pump mechanism to raise petroleum fluid from a subterranean reservoir. Where an electrical grid is available, an electric motor can be used, however the internal combustion engine is widely used and can be fuelled from natural gas coming out of the well, propane, or other fuel. Engines typically comprise a crankshaft with a large flywheel attached on one end and a pulley wheel is attached to the opposite end, and a clutch is provided outboard of the pulley wheel on the end of the crankshaft to control rotation of an output shaft driving the well pump.

The flywheel and pulley wheel rotate whenever the engine is running. The output shaft rotates to drive the well pump when the clutch is engaged, and stops rotating when the clutch is disengaged so that the well pump can be stopped while the engine is left running. Typically as well, the internal combustion engine is started with a hand crank that engages the flywheel end of the crankshaft.

It is known to tap into the liquid coolant circuits on such engines, and incorporate the heating conduit into the coolant circuit such that the coolant fluid circulates through the heating conduit and coolant circuit.

When temperatures drop to a point where flow becomes a problem however, the small engines typically in use do not provide enough heat to maintain the temperature of the coolant sufficiently high to warm the fluid lines. As well the operating temperature of the engine is lowered below its preferred level by the extra cooling resulting in less than optimum engine performance.

A typical well site will require a heating conduit from 200 to 300 feet long, requiring a pump with sufficient capacity to circulate the engine coolant through the lengthy conduit. Engines typically in use often have no coolant pump, or a very low capacity coolant pump, and so a circulating pump has been added in the prior art apparatus for circulating the coolant through the heating conduit.

Because the flywheel end of the crankshaft must be kept clear so that the hand crank can engage that end of the crankshaft to start the engine, in the prior art the circulating pump has been driven from other locations. The circulating pump has typically been driven from the clutched output shaft driving the well pump, and so the circulating pump stops when the well pump is stopped for service or the like. When the circulating pump stops, the coolant flow through the heating conduit stops. Alternatively the circulating pump has been driven with the fan belt of the engine off the pulley wheel, however the fan belt and drive on such engines is quite lightly built, and such a pump drive has been subject to breakdown.

Although not common, where it is critical that flow be maintained and the significant costs are warranted, it is also known to provide another separate internal combustion engine having a liquid coolant circuit and then incorporating the heating conduit into that coolant circuit such that the coolant fluid flows through the heating conduit and coolant circuit. The separate engine is chosen to have a heat output sufficient to maintain the coolant in the coolant circuit and heating conduit at the necessary temperature. The coolant pump of the separate engine can have a coolant pump capacity sufficient to circulate the coolant through the heating conduit, or could drive a separate booster pump. The separate engine thus has the sole purpose of heating the well conduits.

SUMMARY OF THE INVENTION

It is an object of the present invention to provide a heating apparatus for well sites that overcomes problems in the prior art.

In a first embodiment the invention provides a heating apparatus for warming objects on a well site, the well site including an internal combustion engine that drives a well pump for extracting fluid from the well. The heating apparatus comprises a heat exchanger shell having an input port adapted for connection to an exhaust port of the engine, and an output port for directing exhaust from the engine to the atmosphere. A circulating pump is adapted to be driven by the engine, and a heating circuit is connected to the circulating pump such that liquid in the heating circuit is pumped from a pump output through the heating circuit to a pump intake. The heating circuit comprises a heat absorbing portion inside the heat exchanger shell connected to the pump output and arranged such that heat from the exhaust of the engine is transferred to the liquid in the heat absorbing portion, and a heating conduit connected at one end thereof to the heated portion to receive heated liquid from the heated portion and connected at an opposite end thereof to the pump intake, and adapted to be arranged adjacent to an object to be warmed such that heat from the liquid in the heating conduit is transferred to the object to be warmed.

In a second embodiment the invention provides an apparatus for pumping fluid from a well at a well site and directing the pumped fluid through a production conduit to a collection site, and for warming the production conduit to facilitate fluid flow in cold weather. The apparatus comprises an internal combustion engine operative to drive a well pump for extracting fluid from the well. A heat exchanger shell has an input port connected to an exhaust port of the engine, and an output port for directing exhaust from the engine to the atmosphere. A circulating pump is driven by the engine, and a heating circuit is connected to the circulating pump such that liquid in the heating circuit is pumped from a pump output of the circulating pump through the heating circuit to a pump intake of the circulating pump. The heating circuit comprises a heat absorbing portion inside the heat exchanger shell connected to the pump output and arranged such that heat from the exhaust of the engine is transferred to the liquid in the heat absorbing portion, and a heating conduit connected at one end thereof to the heated portion to receive heated liquid from the heated portion and connected at an opposite end thereof to the pump intake, and arranged adjacent to at least a portion of the production conduit, the heating conduit and portion of the production conduit wrapped with an insulation layer such that heat from the liquid in the heating conduit is transferred to the production conduit.

In a third embodiment the invention provides a method of warming objects on a well site where the well site includes an internal combustion engine that drives a well pump for extracting fluid from the well. The method comprises providing a heat exchanger shell, and connecting an input port of the heat exchanger shell to an exhaust port of the engine, and exposing an output port of the heat exchanger shell to the atmosphere; driving a circulating pump with the engine; and connecting a heating circuit to the circulating pump such that liquid in the heating circuit is pumped from a pump output through the heating circuit to a pump intake. The heating circuit comprises a heat absorbing portion inside the heat exchanger shell connected to the pump output and arranged such that heat from the exhaust of the engine is transferred to the liquid in the heat absorbing portion, and a heating conduit connected at one end thereof to the heated portion to receive heated liquid from the heated portion and connected at an opposite end thereof to the pump intake. The heating conduit is arranged adjacent to an object to be warmed and the heating conduit and conduit to be warmed are covered with an insulation layer such that heat from the liquid in the heating conduit is transferred to the object to be warmed.

The present invention provides a heating apparatus that uses the exhaust from an internal combustion engine driving a pump to heat liquid in a heating conduit separate from the cooling circuit of the engine. The heating apparatus can be configured to provide circulation of the heated liquid through the heating conduit at all times that the engine is running. The heating conduit can be arranged to heat production conduits at the well site to facilitate fluid flow in cold weather, or could be arranged to heat buildings or other objects as might be desired.

Instead of circulating the coolant of the engine through the heating conduit as in the prior art, the present invention uses the heat of the exhaust from the engine to heat a separate heating liquid in a heating conduit isolated from the engine cooling circuit, and drives a circulating pump with the engine to circulate the heating fluid through the heating conduit. Conveniently the circulating pump is driven off the flywheel end of the crankshaft so that the circulating pump is always operating when the engine is running, or an alternator and electric pump can be provided, thereby facilitating control of the circulating pump.

The heating circuit comprises a heating conduit that is laid out along the well conduits and covered with insulation. The heating conduit is connected to a heat exchanger shell and a circulating pump circulates the heating fluid through the heating conduit and a heating portion comprising coils or the like inside the heat exchanger shell. The exhaust from the engine is directed into the heat exchanger shell, and the heating fluid passes through the coils and absorbs heat from the exhaust.

An expansion tank can be teed into the heating conduit just prior to the circulating pump intake to allow air to escape and to ensure that the heating circuit is always full of heating fluid.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
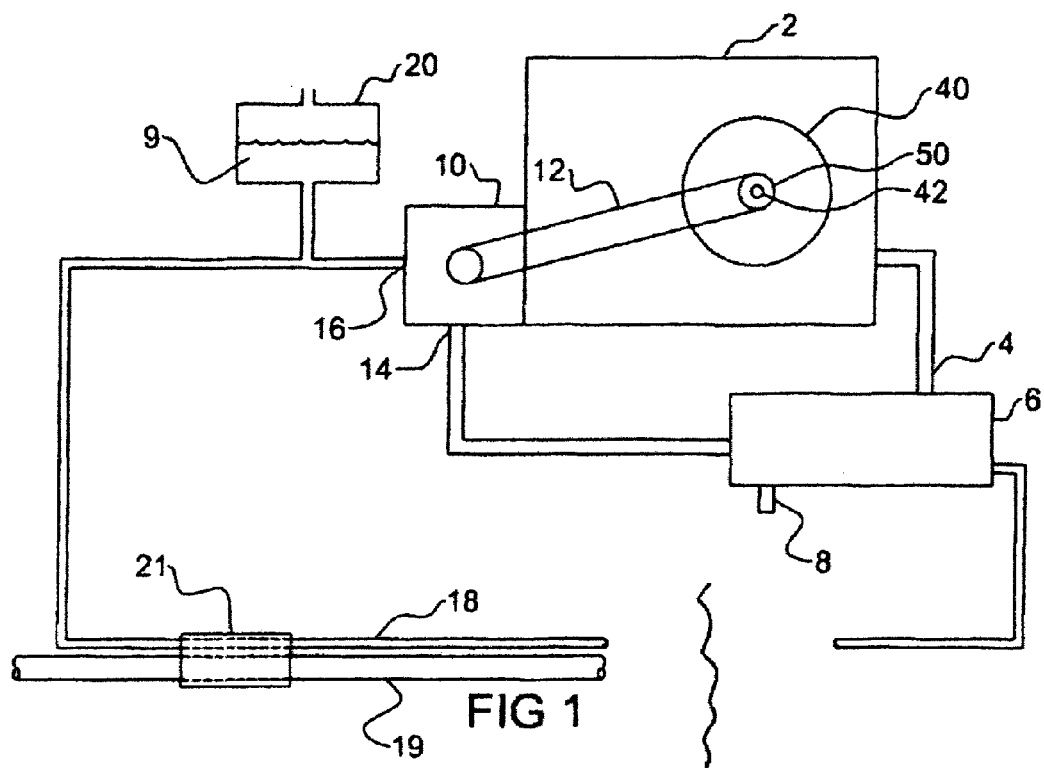
FIG. 1 is a schematic view of a heating apparatus of the invention.

FIG. 1 illustrates a heating apparatus 1 of the invention for warming conduits or other objects on a well site. The well site includes an internal combustion engine 2 that drives a pump (not illustrated) for extracting oil, gas, or the like from the well.

The exhaust of the engine 2 is directed from the engine exhaust port into an input port 4 of a heat exchanger shell 6, and then out of the heat exchanger shell 6 via output port 8 to the atmosphere. A circulating pump 10 is driven by the engine 2 and pumps heating fluid 9 from the output 14 of the circulating pump 10 through a heating circuit to the intake 16 of the pump.

The heating circuit comprises a heat absorbing portion inside the heat exchanger shell, illustrated as coils 24, 28 connected to the pump output 14 and arranged such that heat from the exhaust of the engine 2 is transferred to the liquid flowing through the heat absorbing portion, coils 24, 28.

The heating circuit also comprises a heating conduit 18 connected to receive heated liquid from the heated portion, and arranged adjacent to a conduit to be warmed such that heat from the liquid in the heating conduit is transferred to a conduit to be warmed, such as production conduit 19. Where it is desired to heat other objects at the well site, the heating conduit can be arranged adjacent to the desired objects.

In a typical application the heating conduit 18 will be laid alongside well conduits carrying fluid from the well head to a storage tank or pipeline, and then covered with an insulation layer 21. A heating conduit 18 with a diameter of about one half inch and a length of about 300 feet is contemplated in a typical application.

An expansion tank 20 is teed into the heating conduit 18 prior to the pump intake 16 to allow air in the heating circuit to escape, and contains an amount of heating fluid 9 to also ensure that the heating circuit is always full of heating fluid 9.

Figure 2:
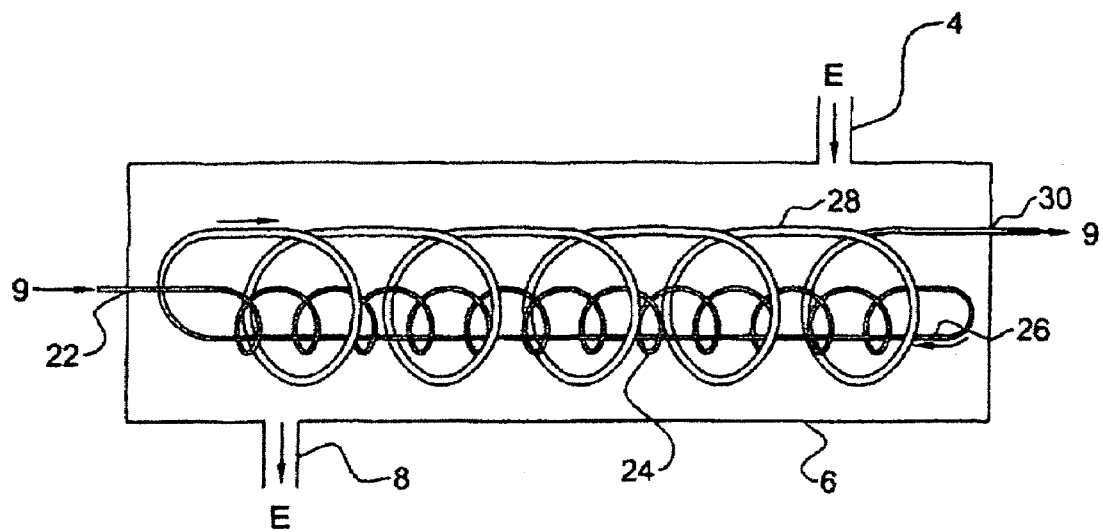
FIG. 2 is a schematic view of an embodiment of a heat exchanger for use with the invention.

FIG. 2 illustrates an embodiment of the heat exchanger showing one arrangement of the heating portion of the heating circuit inside the heat exchanger shell 6. The hot exhaust E from the engine enters through the exhaust port 4, raising the temperature of the interior of the heat exchanger shell 6, and exiting through output port 8 to the atmosphere. The illustrated heat exchanger shell 6 is elongated and the input and output ports 4, 8 are located at opposite ends so that the exhaust flows through the heat exchanger shell 6 and provides heat throughout the interior thereof.

Heating fluid 9 enters the inlet 22 on the heat exchanger shell 6 and passes through an inner coil 24 to the opposite end of the heat exchanger shell 6, then passes back through a center pipe 26 through the inner coil 24, and then back again through an outer coil 28 to an outlet 30 on the heat exchanger shell 6.

Optionally center pipe 26 could be omitted, so that the heating fluid 9 passes from the inner coil 24 directly to the outer coil 28, however it was found that by adding the center pipe 26 and configuring the coils 24, 28 and center pipe 26 as illustrated, the heating fluid 9 is retained within the heat exchanger shell 6 and exposed to the high temperature of the exhaust for a longer time, such that the temperature of the heating fluid 9 at the outlet 30 could be raised 10° F. to about 155° F. in a typical application, compared to the arrangement where the center pipe is deleted. The arrangement with the center pipe 26 adds very little to the cost of the heat exchanger, compared to adding more coil, and appears to increase the temperature of the heating fluid 9 significantly.

Figure 3:
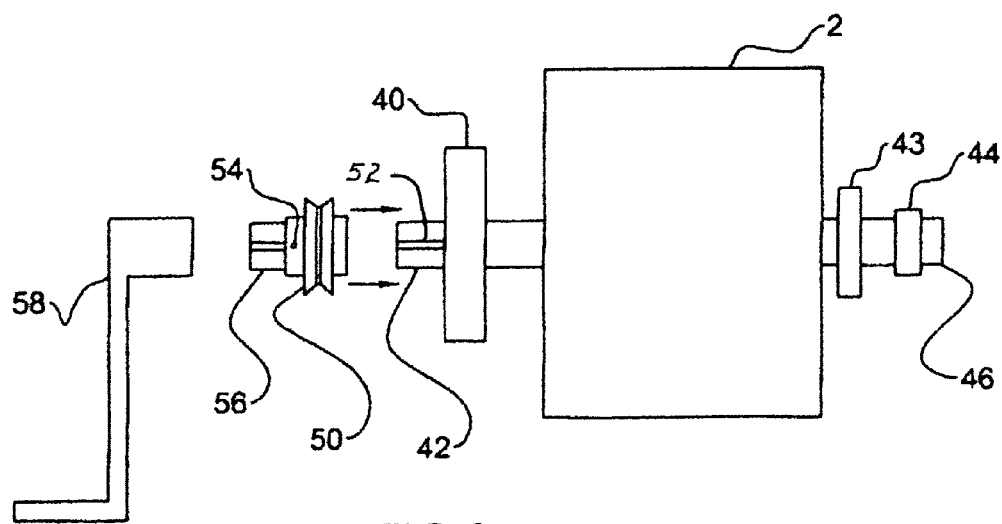
FIG. 3 is a schematic front view of an engine showing the pulley and shaft extension of the invention, and illustrating the use of a hand crank on the shaft extension.

FIG. 3 illustrates a typical engine 2 with the flywheel 40 on one end of the crankshaft 42, and a pulley wheel 43 and clutch 44 on the opposite end of the crankshaft 42. The crankshaft 42 drives an output shaft 46 through the clutch 44, such that when the clutch 44 is engaged the output shaft will rotate to drive a pump, and when the clutch 42 is disengaged the output shaft 46 will stop rotating and the pump can thus be stopped for service and the like while allowing the engine 2 to continue to run. The flywheel 40, pulley wheel 43, and crankshaft 42 are always rotating when the engine 2 is running.

The circulating pump 10, as illustrated in FIG. 1, is driven by a belt 12 that is driven by a pulley 50 mounted on the end of the driveshaft 42. FIG. 3 illustrates the end of the crankshaft 42 extending beyond the flywheel 40 and defining a longitudinal groove or keyway 52. The end of the crankshaft 42 and the keyway 52 conventionally must be left exposed because the engine 2 is started by engaging a hand crank 58 over the end of the crankshaft 42 and into engagement with the keyway 52 so that the hand crank 58 may be rotated to turn the crankshaft 42 and start the engine 2.

In one embodiment the present invention provides a apparatus where the pulley 50 that drives the circulating pump 10 is mounted on the end of the flywheel end of the crankshaft 42. The pulley 50 slides over the end of the driveshaft 42 and a key is inserted in the keyway 52 engaging the pulley 50 and secured with a set screw 54. A shaft extension 56 extends from the pulley 50 that has the same diameter as the end of the crankshaft 42, and also defines a keyway 52. The hand crank 58 can then engage the shaft extension 56 to start the engine 2.

Figure 4:
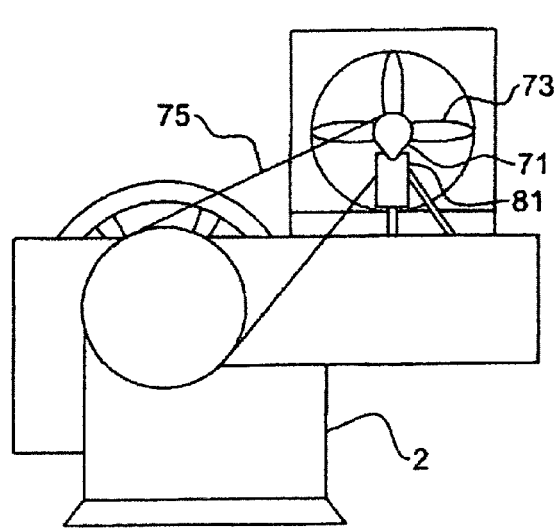
FIG. 4 is a schematic view of an alternator mounted to the engine to drive the circulating pump.
Figure 5:
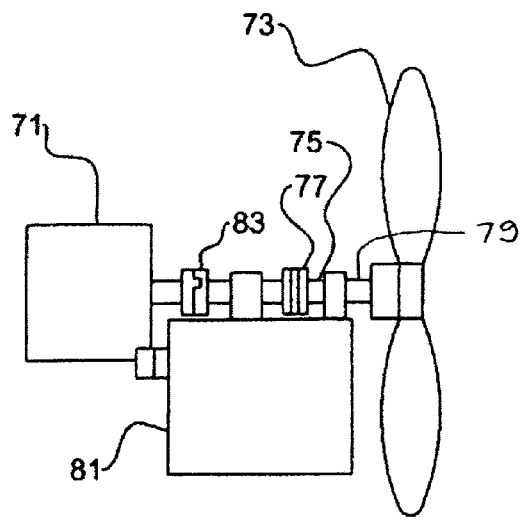
FIG. 5 is a schematic view of the mount for mounting the alternator to be driven by the fan shaft.

In another embodiment, illustrated in FIGS. 4 and 5, an alternator 71 is provided to generate electricity. The engine 2 comprises a cooling fan 73 driven by a fan belt 75 engaging a fan pulley 77 on a fan shaft 79 mounted on bearings. The conventional light fan mount is replaced by a reinforced fan mount 81 that is adapted to mount the alternator 71 as illustrated so same can be coupled directly to the fan shaft 79 by a coupler 83. Thus the alternator is driven by the fan belt 75 through the fan shaft 79. No separate pulley is required to drive the alternator 71, and the wrap around the fan pulley is maintained without providing any idlers or like mechanism to accommodate a separate pulley.

The embodiment of FIGS. 4 and 5 also provides electric current which could be convenient for other uses as well. A battery will typically be provided as well, and could be used to provide electric start for the engine 2.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A heating apparatus for warming objects on a well site, the well site including an internal combustion engine that drives a well pump for extracting fluid from the well, the heating apparatus comprising:
   a heat exchanger shell having an input port adapted for connection to an exhaust port of the engine, and an output port for directing exhaust from the engine to the atmosphere;
   a circulating pump adapted to be driven by the engine;
   a heating circuit connected to the circulating pump such that liquid in the heating circuit is pumped from a pump output through the heating circuit to a pump intake;
   wherein the heating circuit comprises:
      a heat absorbing portion inside the heat exchanger shell connected to the pump output and arranged such that heat from the exhaust of the engine is transferred to the liquid in the heat absorbing portion; and
      a heating conduit connected at one end thereof to the heated portion to receive heated liquid from the heated portion and connected at an opposite end thereof to the pump intake, and adapted to be arranged adjacent to an object to be warmed such that heat from the liquid in the heating conduit is transferred to the object to be warmed.

2. The apparatus of claim 1 wherein the circulating pump is adapted to be driven by the engine by providing a pump pulley adapted to be mounted on an end of an engine crankshaft extending from the engine, and a pump belt engaged on the pump pulley and connected to the circulating pump, such that when the engine is operating the circulating pump is operating.

3. The apparatus of claim 2 wherein the end of the crankshaft is adapted for connection of a crank to rotate and start the engine, and wherein the pump pulley comprises an adapter to allow connection of the crank.

4. The apparatus of claim 1 wherein the circulating pump is adapted to be driven by the engine by providing an electric alternator adapted to be driven by the engine, and wherein the circulating pump is an electric pump.

5. The apparatus of claim 4 wherein the engine comprises a cooling fan driven by a fan belt engaging a fan pulley on a fan shaft, and wherein the alternator is adapted to be driven by the fan belt.

6. The apparatus of claim 5 wherein the alternator is driven by connection of the alternator to the fan shaft.

7. The apparatus of claim 1 wherein the heat exchanger shell is elongated, and wherein the input port is located adjacent one end of the heat exchanger shell and the output port is located adjacent to an opposite end of the heat exchanger shell.

8. The apparatus of claim 7 wherein the heating portion of the heating circuit comprises an inlet on a first end of the heat exchanger shell connected to an inner coil extending to an opposite second end of the heat exchanger shell, a center pipe extending through the inner coil back to the first end of the heat exchanger shell where the center pipe is connected to an outer coil extending to outlet on the second end of the heat exchanger shell.

9. The apparatus of claim 1 wherein the heating circuit comprises an expansion tank open to the atmosphere and operative to allow air in the heating circuit to escape to the atmosphere.

10. An apparatus for pumping fluid from a well at a well site and directing the pumped fluid through a production conduit to a collection site, and for warming the production conduit to facilitate fluid flow in cold weather, the apparatus comprising:
   an internal combustion engine operative to drive a well pump for extracting fluid from the well;
   a heat exchanger shell having an input port connected to an exhaust port of the engine, and an output port for directing exhaust from the engine to the atmosphere;
   a circulating pump driven by the engine, and a heating circuit connected to the circulating pump such that liquid in the heating circuit is pumped from a pump output of the circulating pump through the heating circuit to a pump intake of the circulating pump;
   wherein the heating circuit comprises:
      a heat absorbing portion inside the heat exchanger shell connected to the pump output and arranged such that heat from the exhaust of the engine is transferred to the liquid in the heat absorbing portion; and
      a heating conduit connected at one end thereof to the heated portion to receive heated liquid from the heated portion and connected at an opposite end thereof to the pump intake, and arranged adjacent to at least a portion of the production conduit, the heating conduit and portion of the production conduit wrapped with an insulation layer such that heat from the liquid in the heating conduit is transferred to the production conduit.

11. The apparatus of claim 10 comprising a pump pulley mounted on an end of an engine crankshaft extending from the engine, and a pump belt engaged on the pump pulley and connected to the circulating pump such that when the engine is operating the circulating pump is operating.

12. The apparatus of claim 11 wherein the end of the crankshaft is adapted for connection of a crank to rotate and start the engine, and wherein the pump pulley comprises an adapter to allow connection of the crank.

13. The apparatus of claim 10 wherein the circulating pump is adapted to be driven by the engine by providing an electric alternator adapted to be driven by the engine, and wherein the circulating pump is an electric pump.

14. The apparatus of claim 13 wherein the engine comprises a cooling fan driven by a fan belt engaging a fan pulley on a fan shaft, and wherein the alternator is adapted to be driven by the fan belt.

15. The apparatus of claim 14 wherein the alternator is driven by connection of the alternator to the fan shaft.

16. The apparatus of claim 10 wherein the heat exchanger shell is elongated, and wherein the input port is located adjacent one end of the heat exchanger shell and the output port is located adjacent to an opposite end of the heat exchanger shell.

17. The apparatus of claim 16 wherein the heating portion of the heating circuit comprises an inlet on a first end of the heat exchanger shell connected to an inner coil extending to an opposite second end of the heat exchanger shell, a center pipe extending through the inner coil back to the first end of the heat exchanger shell where the center pipe is connected to an outer coil extending to outlet on the second end of the heat exchanger shell.

18. The apparatus of claim 10 wherein the heating circuit comprises an expansion tank open to the atmosphere and operative to allow air in the heating circuit to escape to the atmosphere.

19. A method of warming objects on a well site, the well site including an internal combustion engine that drives a well pump for extracting fluid from the well, the method comprising:
   providing a heat exchanger shell, and connecting an input port of the heat exchanger shell to an exhaust port of the engine, and exposing an output port of the heat exchanger shell to the atmosphere;
   driving a circulating pump with the engine;
   connecting a heating circuit to the circulating pump such that liquid in the heating circuit is pumped from a pump output through the heating circuit to a pump intake;
   wherein the heating circuit comprises:
      a heat absorbing portion inside the heat exchanger shell connected to the pump output and arranged such that heat from the exhaust of the engine is transferred to the liquid in the heat absorbing portion; and
      a heating conduit connected at one end thereof to the heated portion to receive heated liquid from the heated portion and connected at an opposite end thereof to the pump intake;
   arranging the heating conduit adjacent to an object to be warmed and covering the heating conduit and object to be warmed with an insulation layer such that heat from the liquid in the heating conduit is transferred to the object to be warmed.

20. The method of claim 19 wherein the circulating pump is driven by a belt engaging a pump pulley mounted on an end of an engine crankshaft extending from the engine such that when the engine is operating the circulating pump is operating.

21. The method of claim 19 wherein the circulating pump is driven by the engine by driving an electric alternator with the engine, and powering an electric circulating pump from the alternator.

22. The method of claim 19 wherein the heat exchanger shell is elongated, and wherein the input port is located adjacent one end of the heat exchanger shell and the output port is located adjacent to an opposite end of the heat exchanger shell.

23. The method of claim 22 wherein the heating portion of the heating circuit comprises an inlet on a first end of the heat exchanger shell connected to an inner coil extending to an opposite second end of the heat exchanger shell, a center pipe extending through the inner coil back to the first end of the heat exchanger shell where the center pipe is connected to an outer coil extending to outlet on the second end of the heat exchanger shell.

24. The method of claim 19 wherein the heating circuit comprises an expansion tank open to the atmosphere and operative to allow air in the heating circuit to escape to the atmosphere.

* * * * *